H. W. HARGOOD.
VALVE MECHANISM.
APPLICATION FILED JUNE 11, 1921.
1,397,685.
Patented Nov. 22, 1921.
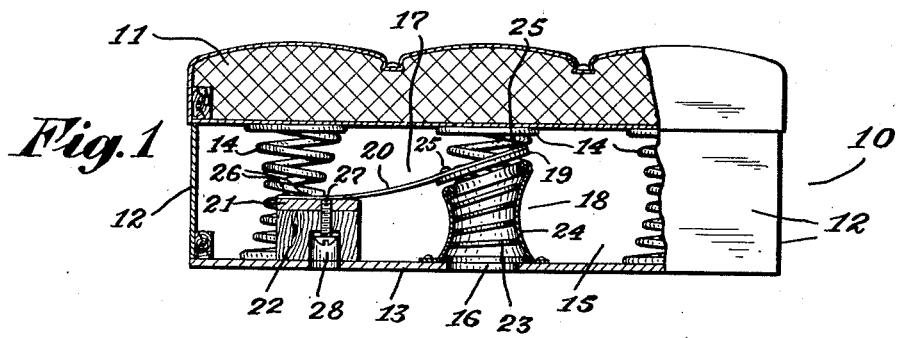
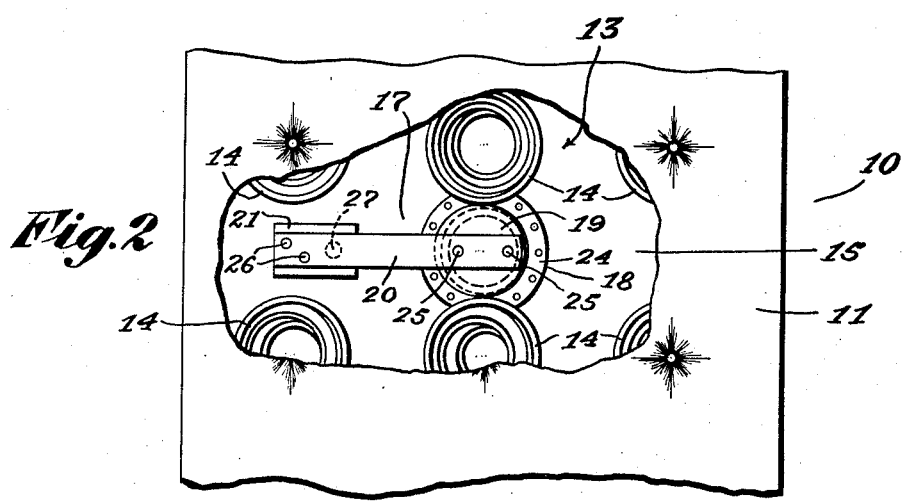
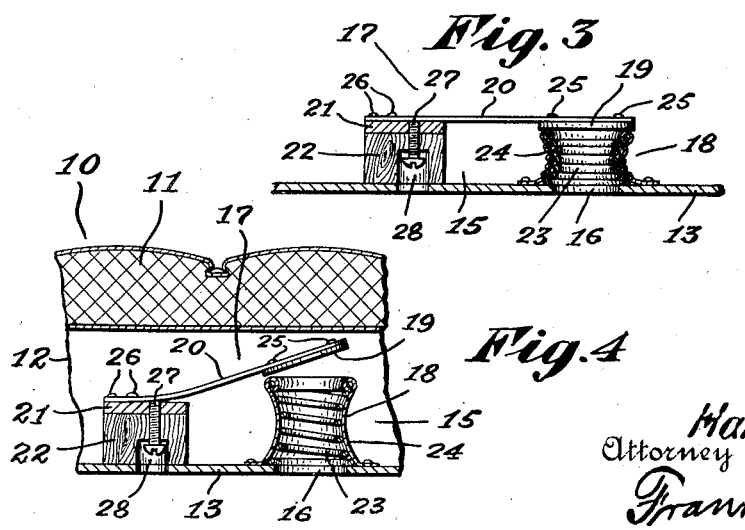
Inventor
Harry W. Hargood.
Attorney
Frank Warren

UNITED STATES PATENT OFFICE.

HARRY W. HARGOOD, OF SEATTLE, WASHINGTON.

VALVE MECHANISM.

1,397,685.  Specification of Letters Patent.  Patented Nov. 22, 1921.

Application filed June 11, 1921. Serial No. 476,650.

*To all whom it may concern:*

Be it known that I, HARRY W. HARGOOD, a citizen of the United States, residing at Seattle, in the county of King and State of Washington, have invented a certain new and useful Improvement in Valve Mechanism, of which the following is a specification.

My invention relates to improvements in valve mechanisms for pneumatic cushions for automobile seats and backs or the like, and the object of my invention is to provide a valve mechanism adapted to be disposed within a pneumatic spring cushion and to be automatically closed by sudden or heavy pressure on said cushion to thus utilize the resiliency of the air retained therein.

Another object is to provide a valve mechanism for a pneumatic spring cushion embodying novel adjusting means to thus adapt the cushion for use with persons of varying weights.

A further object is to provide a valve mechanism for a pneumatic spring cushion embodying novel means whereby the wear on said valve is reduced to a minimum.

A still further object is to provide a valve mechanism for a pneumatic spring cushion embodying novel means adapted to render the valve noiseless in its action.

A still further object is to provide a valve mechanism spring cushion embodying simplicity, durability and economy in construction, that is positive and efficient in operation, and that will not readily get out of order.

With the above and other objects in view which will appear as the description proceeds, my invention resides in the novel construction, combination, adaptation and arrangement of parts hereinafter described and claimed.

I accomplish these objects by devices illustrated in the accompanying drawings, wherein—

Figure 1 is a view partly in transverse section and partly in end elevation of a pneumatic spring cushion equipped with valve mechanism embodying the features of my invention, said valve mechanism being illustrated in an open or inoperative position;

Fig. 2 is a fragmentary top plan view of the cushion with parts broken away to more clearly illustrate the location of the valve mechanism and spring therefor.

Fig. 3 is a view in longitudinal section of my valve mechanism illustrating the same in a closed or operative position, and Fig. 4 is a fragmentary transverse sectional view of a pneumatic spring cushion equipped with a slightly modified form of my valve mechanism, said mechanism being illustrated in an open or inoperative position.

Referring to the drawings, throughout which like reference numerals indicate like parts, the numeral 10 indicates a cushion of the type in general use in motor vehicles and the like.

The cushion 10 comprises an upper padded portion 11, side walls 12, a solid bottom wall 13, and coil springs 14.

The upper padded portion 11 may be of any well known construction, and is fabricated in such a manner that air will not readily pass therethrough.

The side walls 12 are attached at their upper edges to the lower edges of the padded portion 11 in any well known manner. Said side walls being formed of flexible material that is reasonably impervious to the passage of air therethrough, as for example rubberized cloth.

The solid bottom wall 13 is adapted to be attached at its edges thereof to the lower edges of the side walls 12, in any well known or desired manner, which bottom wall may be formed of wood or metal as desired.

The coil springs 14 are adapted to be interposed between the upper padded portion 11 and the bottom wall 13 and are further adapted to be secured in position therebetween in any well known and desired manner, to thus form a resilient support for said upper padded portion 11, as will be readily understood.

The upper padded portion 11 in conjunction with the side walls 12 and the bottom wall 13 are adapted to form a compartment 15, the walls of which compartment are sufficiently tight to offer considerable resistance to the sudden outlet of air.

To permit of the free passage of air into and from the compartment 15, I have provided the solid bottom wall 13 with an opening 16 of suitable size, which opening 16 may be disposed substantially near the center of said bottom wall.

To properly control the ingress and egress of the air into and from the compartment 15 through the opening 16, I have provided my valve mechanism 17.

My valve mechanism 17 comprises a tubular valve member 18, a check or flap valve 19, a flat spring or resilient member 20, a metallic plate 21 and a support block or base 22.

The tubular valve member 18 is adapted to be disposed within the compartment 15 in superposed and concentric relation with respect to the opening 16. Said tubular valve member comprising a coil spring 23 and a tubular covering 24 for said spring which tubular covering is formed of flexible material that is reasonably impervious to the passage of air therethrough, such as rubberized cloth.

The tubular covering 24 is adapted to be secured at its lower edges to the inner face of the bottom wall 13 adjacent the edges of the opening 16, while the upper edges of the said tubular covering are adapted to be secured to the uppermost coil of the spring 23, as by stitching or in any other well known or desired manner, to thus positively retain said spring in its proper operative position relative to the opening 16 and to also maintain the covering 24 in a normally distended condition, as will be readily understood.

The check valve 19 is formed substantially in the shape of a disk, although the same may be formed rectangular if desired. Said check valve being normally superposed in spaced relation upon the tubular valve member 18 and is adapted to seat upon said tubular valve member when the cushion 10 is subjected to sudden or heavy pressure, to thus prevent the further escape of air from the compartment 15.

The flat spring 20 is adapted to be fixedly secured at one end thereof to the check valve 19, as by rivets 25, while the other or opposite end of said spring 20 is adapted to be fixedly secured to the metallic disk 21 as by rivets 26.

The said flat spring 20 is further adapted and constructed to normally maintain the check valve 19 in an open position, the degree of resilience of said spring being such that the said check valve will close only when the cushion 10 is subjected to sudden or heavy pressure.

The metallic plate 21 is fixedly secured to the upper face of the support block 22 in any well known manner.

The support block 22 may be formed of wood or other suitable material and is adapted to be fixedly secured within the compartment 15 to the upper face of the bottom wall 13 in any well known and desired manner.

In Fig. 1, I have shown the upper end of the tubular valve member 18 disposed in an inclined plane and in spaced and substantially parallel relation to the check valve 19 when the latter is in an inoperative position, to thus allow said check valve to close the said tubular valve member in any position.

To adapt the cushion for use with persons of varying weights, I have provided the check valve 19 with novel adjusting means comprising a screw 27, which screw is adapted to be threadably engaged for adjustment in the metallic plate 21. The inner end of said screw being adapted to normally abut the underside of the flat spring 20, to thus increase or decrease the resilience of the same as desired.

To present a smooth surface for the underside of the cushion 10, I have formed and provided a recess 28 for the head of the screw 27, which recess is cut in the bottom wall 13 and the support block 22 substantially as shown in Fig. 1.

In Fig. 4, I have shown the upper end of the tubular valve member 18 disposed in a normally horizontal plane, which form due to the resilient construction of said tubular valve member will permit the check valve 19 to close said tubular valve member in any position, said tubular valve member being further adapted to be closed by the lower face of the upper padded portion 11 when the same is depressed, as for example, when the cushion 10 is subjected to a sudden or heavy pressure.

In practice and after exhaustive tests I have found that satisfactory results are obtained by utilizing the valve 19 to close the opening 16 without the aid of the tubular valve member 18. I have also found that similar results are obtained by utilizing the tubular valve member 18 to close the opening 16 without the aid of the check valve 19, in which case said tubular member is closed by the underside of the upper padded portion 11 abutting the upper end of the same, when the cushion 10 is subjected to sudden or heavy pressure, as for example, when exceptionally heavy persons are disposed thereon. In which event the tubular valve member 18 is compressed substantially to the position, shown in Fig. 3.

However, I have further found after the aforesaid exhaustive tests that the maximum results are obtained by combining the tubular valve member 18 with the check valve 19 to thereby provide a valve mechanism that is efficient and noiseless in action and that will not readily wear out.

To further improve the noiseless action of the valve mechanism 17, the check valve 19 if desired may be provided on its lower face with a rubber gasket or washer, not shown.

In extremely large cushions I provide a plurality of valve mechanisms 17, to thus obtain and maintain the same uniform resilience as obtained and maintained in smaller cushions equipped with a single valve mechanism 17.

It will therefore be apparent from the foregoing that a pneumatic spring cushion equipped with the valve mechanism 17, that the said mechanism will not be affected or actuated when the cushion springs 14 are working under normal conditions, but will be actuated or closed if the cushion 10 is subjected to an unusually heavy shock thereby causing the air to be momentarily compressed within the compartment 15, so that said air will reinforce the springs 14 and by sustaining a portion of the shock will tend to prevent said springs from being compressed to a breaking point.

The operation of my valve mechanism is as follows: When the cushion 10 is carrying or supporting a load and working under normal conditions the check valve 19 will be held in an open position by the flat spring 20 substantially as shown in Figs. 1 and 3, for the reason that the force of the air passing outwardly from the compartment 15 through the opening 16 is not sufficient to close the valve 19 against the action of the flat spring 20, but, if the cushion 10 is subjected to an unusual quick shock the outward rush of air from said compartment 15 through said opening 16 will be sufficient to overcome the action of the spring 20 and close the check valve 19 upon the tubular valve member 18, substantially as shown in Fig. 3, thereby causing the air retained within the compartment 15 to be compressed, to thus reinforce the springs 14 and to assist in absorbing the said shock before said springs are compressed sufficiently to cause them to break.

Should the shock or load on the cushion 10 be unusually heavy the tubular valve member 18 will also be compressed substantially to the position shown in Fig. 3, by reason of the fact that the upper padded portion 11 will be sufficiently depressed by said shock or weight so that the underside of said portion 11 will be caused to contact with the upper side of the check valve 19.

When the shock has been arrested or the additional load upon the cushion 10 removed the valve mechanism will again assume, a relatively and substantially open position and said cushion will resume a normal working condition.

From the foregoing description taken in connection with the accompanying drawings, the advantages of the construction and the method of operation of my valve mechanism will be readily apparent to those skilled in the art to which my invention pertains, to thus enable those so skilled to construct and operate the same, but, while I have shown and described the construction and operation of a valve mechanism embodying the features and principles of my invention, which I now consider to be the best embodiment thereof, I desire to have it understood that the valve mechanism shown, is merely illustrative and that such changes may be made when desired as are within the scope of my invention and embodied in the accompanying claim.

What I claim is:

A valve mechanism for a pneumatic spring cushion having a closed compartment with an opening formed in the walls thereof, said valve mechanism comprising a resilient tubular valve member adapted to be superposed in concentric relation on said opening, a check valve adapted to close said tubular valve member and said opening, and resilient means adapted to normally hold said check valve in an open position, said resilient means being adapted to permit said check valve to close in response to the outward passage of an excess quantity of air through said tubular valve member and said opening.

In witness whereof, I hereunto subscribe my name this 4th day of June, A. D. 1921.

HARRY W. HARGOOD.